United States Patent [19]

Tsujii et al.

[11] Patent Number: 4,510,577
[45] Date of Patent: Apr. 9, 1985

[54] NON-CONTACT RADIATION THICKNESS GAUGE

[75] Inventors: Tatsuo Tsujii, Tokyo; Takaaki Okino, Fuchu, both of Japan

[73] Assignee: Tokyo Shibaura Denki Kabushiki Kaisha, Japan

[21] Appl. No.: 349,979

[22] Filed: Feb. 18, 1982

[51] Int. Cl.³ .............................................. G01B 15/02
[52] U.S. Cl. ..................................... 364/563; 73/1 J; 378/54; 364/571
[58] Field of Search ................... 364/563, 571; 378/54, 378/56; 250/358.1, 359.1, 360.1; 73/1 R, 1 J

[56] References Cited

U.S. PATENT DOCUMENTS

| Re. 25,353 | 3/1963 | Foster et al. | 378/54 |
| 3,529,162 | 9/1970 | Troutman | 378/54 X |
| 3,864,573 | 2/1975 | Hoffman et al. | 250/358 |
| 3,955,086 | 5/1976 | Tsujii et al. | 364/563 X |
| 4,009,376 | 2/1977 | Faraguet | 235/151.3 |
| 4,119,846 | 10/1978 | Outhwaite et al. | 378/56 |
| 4,162,528 | 7/1979 | Maldanado et al. | 364/563 |

FOREIGN PATENT DOCUMENTS

| 165496 | 12/1979 | Japan. |
| 8327 | 1/1980 | Japan. |
| 56-100307 | 8/1981 | Japan. |
| 1597010 | 9/1981 | United Kingdom. |

OTHER PUBLICATIONS

X-Ray Thickness Gauge, TOSGAGE-500 Series, (Toshiba Review).

Primary Examiner—Gary Chin
Assistant Examiner—Edward R. Cosimano
Attorney, Agent, or Firm—Finnegan, Henderson, Farabow, Garrett & Dunner

[57] ABSTRACT

A noncontact thickness gauge system for measuring the thickness of a material is disclosed which includes a source of penetrating radiation, a radiation detector for detecting the amount of radiation received from the radiation source where the level of received radiation is a function of the radiation absorption characteristics and thickness of the material located in the radiation path, a memory for storing the output signals of the detector and curve-defining parameters for a plurality of calibration curves which correspond to respective ranges of thickness values, and a processor for processing the various signals and curve-defining parameters to determine the thickness of the material in the radiation path. The calibration curves are quadratic and are defined by at least three calibration points. Measurements using the radiation thickness gauge system are done after precalibrating the gauge system to obtain a plurality of calibration curves, storing the calibration curves in the memory, providing the signals representative of the nominal thickness and the alloy compensation coefficient for the material to be measured, selecting the calibration curve corresponding to a particular thickness range, compensating the calibration curve of the selected range for drift, inserting the material to be measured into the radiation path and then processing the output signal of the detecting means with the compensated calibration curve to determine the apparent thickness of the material.

26 Claims, 14 Drawing Figures

NON-CONTACT RADIATION THICKNESS GAUGE

BACKGROUND OF THE INVENTION

This invention relates to an improvement in a non-contact radiation thickness gauge which is used to measure the thickness of various materials by detecting the amount or intensity of the radiation transmitted through the material. One such gauge is disclosed in U.S. Pat. No. 3,955,086 to Tsujii et al. and assigned to the present assignee.

Thickness gauges of this type have been used in various applications. Such gauges make it possible to continuously measure the thickness of sheets of various materials without actual contact with the material. The response of radiation gauges, such as x-ray gauges, is fast and can be used for on-line measurement in rolling mill lines of metals where rapid automatic adjustment is necessary to achieve continuous and uniform thickness of the sheets.

The non-contact type thickness gauge found in the prior art normally uses movable standards of predetermined thickness values for calibration of the gauge system. Typically, one or more of the standards of known precise thickness are selected and placed into the beam and an analog meter coupled to the output of the detector is nulled to the particular nominal thickness of the standard. Deviations from the nominal thickness as the material is measured will appear as deviations on the meter. Other prior art systems use complementary standards in which the full measurement range is divided into a plurality of subranges. The calibration for each subrange is normally referenced to a single standard of maximum thickness. This single standard is termed the "base standard." If the gauge is calibrated to null when the base standard is in the path of the beam, it is then possible, with the base standard removed, to measure lesser thicknesses of material which fall within the subrange of thicknesses. Certain ones of the standards which complement the desired thickness of the strip so that the total material thickness is equivalent to that of the base standard are then inserted into the beam. When the thickness is correct, the analog meter will be nulled.

Two point calibration systems have been used. In this type of system, two sets of standards are sequentially inserted into the radiation beam path during the calibration operation. The first of the standards is selected to be the apparent thickness of the material which is calculated from the nominal thickness and alloy compensation coefficient of the material. The apparent thickness of a second standard is selected to be the desired apparent thickness of the material plus some predetermined deviation from the desired thickness. Such a system is calibrated based on the two apparent thickness points and relies on the assumed relation that the output signal of the detector and the thickness of the material to be gauged is linear. Such a system may be considered a linear interpolation system.

In the prior art systems, the calibration is usually done directly for the material to be gauged, i.e., the system is calibrated for apparent thickness. The alloy compensation is accomplished in the calibration process and not during measurement. Such systems also require recalibration each time there is a change of nominal thickness when the thickness of the material to be gauged in the radiation path is changed.

Because such systems usually must combine standards to achieve the apparent thickness of the material to be gauged, a very large number of standard plates must be used. A large number of plates also is required because of the type of linear approximation used in calibrating the system. For instance, in one system a binary coded decimal series of plates starting with a very thin 0.001 mm plate up to a plate of 8 mm thickness is used.

Also in prior art gauging systems, drift in the measurements due to changes in radiation source voltage or sensitivity of the detector must be compensated for. This is usually done by adjusting the gain of a preamplifier through various feedback systems.

SUMMARY OF THE INVENTION

Accordingly, it is an object of this invention to provide an improved non-contact radiation thickness gauge system which relies on a highly accurate quadratic interpolation method.

Another object of this invention is to adjust for alloy compensation during the measurement mode rather than during calibration of the gauging system.

A still further object of this invention is to be able to change the nominal thickness while a material is being gauged in the radiation beam without recalibration.

A still further object is to reduce the number of standard plates required by selecting a finite number of calibration points arranged in an approximate geometric progression from which calibration curves are determined.

According to this invention, these and other objects can be accomplished by providing a non-contact radiation thickness gauge system which uses a plurality of movable standards of predetermined thickness values which comprises a radiation source, means for detecting radiation received from the source and for producing output signals which are functionally related to the level of radiation received, memory means for storing calibration curve-defining parameters for a plurality of calibration curves which correspond to respective ranges of thickness where the calibration points for the curves selected approximate geometric series of thickness values over the entire range and where at least three calibration points and the corresponding output signals of the detecting means define each curve, a unit for setting a nominal thickness and alloy compensation coefficient for the material to be measured and means for processing the output signals of the detecting means and the setting unit, when the material to be measured is in the radiation path, with a calibration curve stored in the memory to determine the thickness of the material.

BRIEF DESCRIPTION OF THE DRAWINGS

Further objects and advantages of the invention together with the organization thereof can be more fully understood from the detailed description to follow taken in conjunction with the following drawings in which.

DESCRIPTION OF THE PREFERRED EMBODIMENT

Reference will now be made in detail to the preferred embodiments of the invention which is exemplified in the accompanying drawings.

Figure 1:
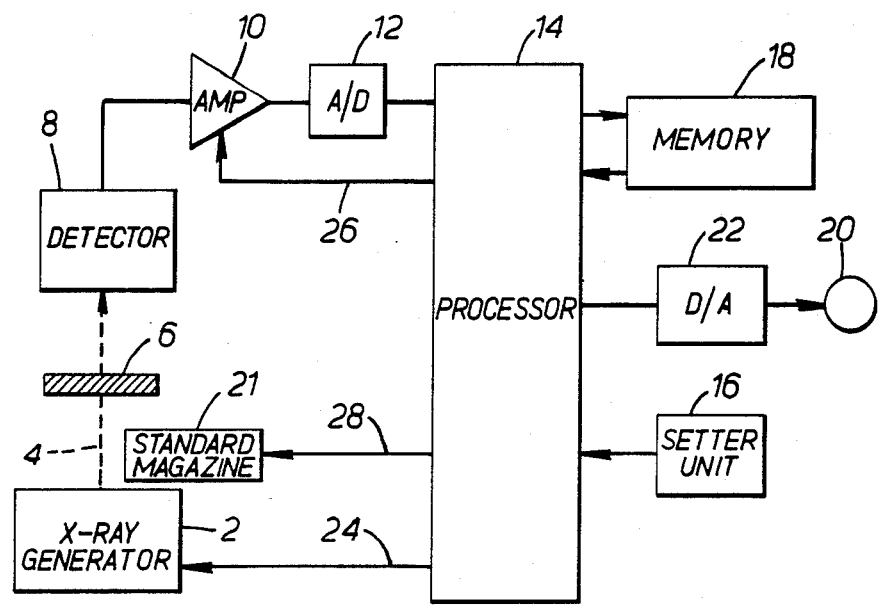
FIG. 1 is a schematic block diagram of the non-contact radiation thickness gauge system of the present invention.

The preferred embodiment of the non-contact radiation thickness gauge system is shown in FIG. 1. A source of penetrating radiation, here shown as x-ray generator 2, generates x-ray radiation along a path 4 through material 6. Detecting means including detector 8, amplifier 10 and analog-to-digital (A/D) converter 12 receives radiation from source 2 and produces an output signal functionally related to the level of radiation received. The level of received radiation is a function of the radiation absorption characteristic and thickness of material 6 located in the radiation path between the source and detecting means. The radiation detector 8 is disposed to receive x-ray radiation transmitted from x-ray generator 2 through material 6 and convert the received radiation into an electric signal applied to amplifier 10. The amplified signal from amplifier 10 is converted to a digital format (preferably a 16 bit format) by A/D converter 12 and is coupled to processor 14.

Processor 14 receives an output signal from a setter unit 16 which produces a thickness set signal corresponding to the nominal thickness $T_n$ and the alloy compensation coefficient N of the material to be measured. Memory means includes memory 18 in which data is stored and supplied to processor 14 to obtain calibration curves by arithmetical operations to be described below.

A thickness indicator 20 which receives the output from processor 14 through the digital-to-analog (D/A) converter 22 indicates the thickness deviation from the desired or nominal thickness $T_n$.

The processor 14, as here embodied, calculates and stores data of the calibration curves in the memory 18, processes the data and other received signals, delivers as an output a thickness deviation to the thickness indicator 20, and generates various signals to facilitate the operations of calibration and measurement. For instance, processor 14 controls the voltage setting of x-ray generator 2 by the signal applied on line 24 and provides the gain setting for amplifier 10 on line 26.

The preferred gauge system of this invention also includes a standard magazine 21 containing a plurality of movable standard plates of predetermined thickness value. The standard plates are made of a prescribed material and have precise but different thicknesses. Selected combinations of the reference sheets are inserted and withdrawn from the radiation path 4 under control of the processor 14 through line 28.

GENERAL DESCRIPTION OF OPERATION

The operation of the non-contact radiation thickness gauge system primarily includes (1) precalibration, (2) range calibration and (3) measuring operations. The gauge system also can be operated to change the thickness setting while the material being gauged is present in the radiation beam path.

In accordance with this invention, the first operation, precalibration is initiated by dividing the total thickness range of the thickness gauge system into a plurality of thickness ranges.

The precalibration operation prepares calibration curves successively for each of the respective ranges. This operation takes about seventy (70) seconds and should be done every eight (8) hours or so. Such curves are referred to hereafter as precalibration curves. Generally precalibration or calibration curves refer to those curves representative of the functional relation between the thickness of the material being measured and the output signal from the detector means, here being the output signal of the analog-to-digital converter 12.

In accordance with this invention, the second operation, range calibration includes a setting and range selection step followed by drift compensating calibration for the range selected for use in the measurement operation. The setting and range selection steps include (1) setting a nominal thickness $T_n$ and an alloy compensation coefficient N of the material to be measured, and (2) of automatically selecting the appropriate thickness range for thickness measurement based on the set values $T_n$ and N. The subsequent drift compensating calibration step for the selected range is needed to correct any drift which occurs following precalibration of the gauge system. A new compensated calibration curve for the selected range is prepared and stored in memory 18. It is preferred that range calibration occur following each new range selection step and normally it requires about five seconds.

According to the present invention, the third operation, measurement, requires that the material to be measured is placed in the path of the radiation beam and its thickness measured using the drift-compensated calibration curve with the output signal of the detector means.

The non-contact radiation thickness gauge of the present invention can also be operated to change the setting in the thickness setting unit 16 while the material being gauged is present in the radiation beam path. To calculate the drift compensation calibration curves described above, it is necessary to insert standard plates into the path of the radiation beam. Since this cannot be done if the material to be measured is also in the beam path, the procedure is to select the drift compensated calibration curve that had previously been obtained for the same selected range in the next previous drift compensation calibration operation. This drift-compensated calibration curve is then read into memory 18 and the material is measured for its thickness using the drift compensation calibration curve thus read out.

The Thickness Ranges and Standards

Figure 2A:
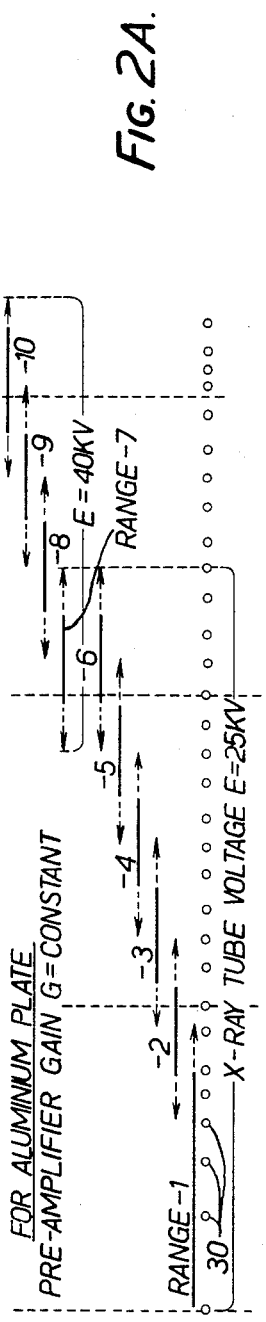
FIGS. 2A, 2B, and 2C are exemplary tables respectively showing preferred ranges of thickness values for measuring aluminum plate, cold strip mill steel plate, and hot strip mill steel plate.
Figure 2B:
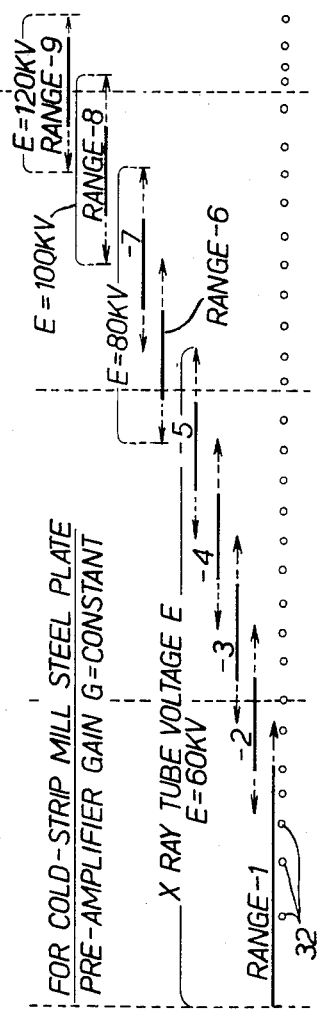
Figure 2C:
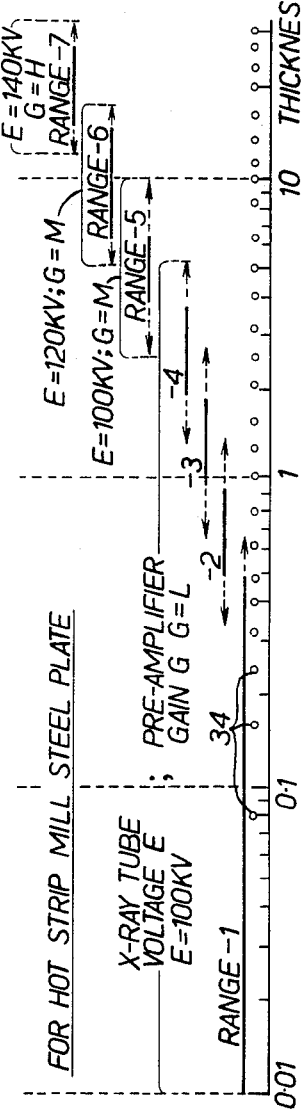

Referring to FIGS. 2A, 2B, and 2C, there is shown a preferred arrangement of thickness ranges for aluminum plates, cold strip mill steel plates, and hot strip mill steel plates, respectively. The thickness values are shown on a logarithmic scale taken along the x-axis, and the calibration points used during calibration for these respective materials are respectively shown as dots 30, 32 and 34.

The ranges are arranged in overlapping relation to each other. For example, as shown in FIG. 2B, the thickness gauge used for measuring the thickness of cold strip mill steel plate has nine ranges which overlap one another. The second range covers thickness values from 0.04 mm to 0.16 mm and the third range covers thickness values from 0.08 mm to 0.32 mm. The ranges overlap between 0.08 mm and 0.16 mm, and there is similar overlap for the other ranges.

The total range in each case is divided into a plurality of ranges, e.g., nine ranges, range-1 to range-9, are shown for the thickness gauge used with cold strip mill steel plates in FIG. 2B. Other required parameters are shown, such as the voltage for x-ray source 2 and the gain of preamplifier 10 which are determined and controlled by processor 14 dependent upon the material being gauged and the range selected as shown in FIGS. 2A, 2B, and 2C.

For the thickness gauge system used with hot strip mill steel plates (FIG. 2C), for example, the x-ray source voltage is set at 100 kv and the preamplifier is set at a low gain level when measurements are taken in ranges from range-1 through range 4. When measurements are made in range-5, the source voltage is set at 100 kv, but the preamplifier gain is set at a middle gain level. For range-6, the source voltage is set at 120 kv and the preamplifier gain at a middle gain level, and for range-7 the source voltage is set at 140 kv while the gain is set at a high level. It will be noted these parameters are also shown for the respective ranges for measurement of aluminum plate (FIG. 2A) and hot-strip mill steel plate (FIG. 2C).

The standard magazine 21 includes a plurality of known precise thickness standard plates of known material which individually or combined provide the respective calibration point values 30, 32 and 34. In the thickness gauge systems used for aluminum, the standard plates consist of pure aluminum, while pure iron is used for hot strip and cold strip mill steel. The respective thicknesses of the standard plates are preferably selected in a binary series such that they have thicknesses respectively of 0.01 mm; 0.02 mm; 0.04 mm; 0.08 mm; 0.16 mm; 0.32 mm; 0.64 mm; 1.28 mm; 2.56 mm; 5.12 mm; 10.24 mm; and 20.48 mm. It will be recognized that the standard plate of 20.48 mm is not required for gauges measuring the thickness of aluminum or cold strip mill steel but is required for the hot strip mill steel.

During the calibration operation, the standards selected are composed of one or more standard plates from standard magazine 21. The greater the number of standard plates required, the larger the error induced because of scattered x-ray radiation due to the layered plates. Accordingly, the standard calibration points are selected such that the thicknesses at the respective calibration points 30, 32, and 34 can be composed of at the most three standard plates. During the calibration operation, certain single plates or combinations of two or three standard plates are sequentially inserted into the radiation beam path from the magazine 21. The operation is controlled by instructions from the processor 14.

Operation of the Memory

Figure 3:
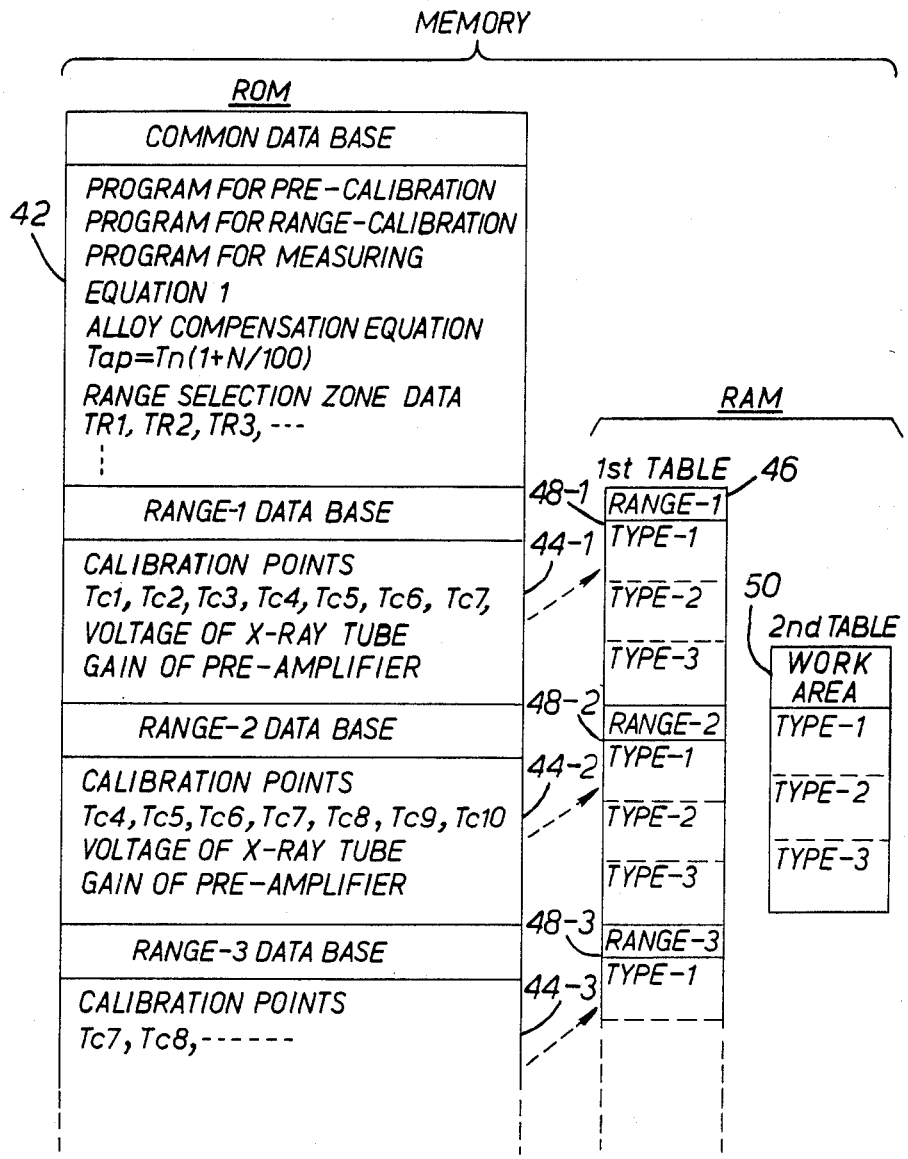
FIGS. 3–5 show the transfer and manipulation of data in the memory of the non-contact radiation thickness gauge system.
Figure 4:
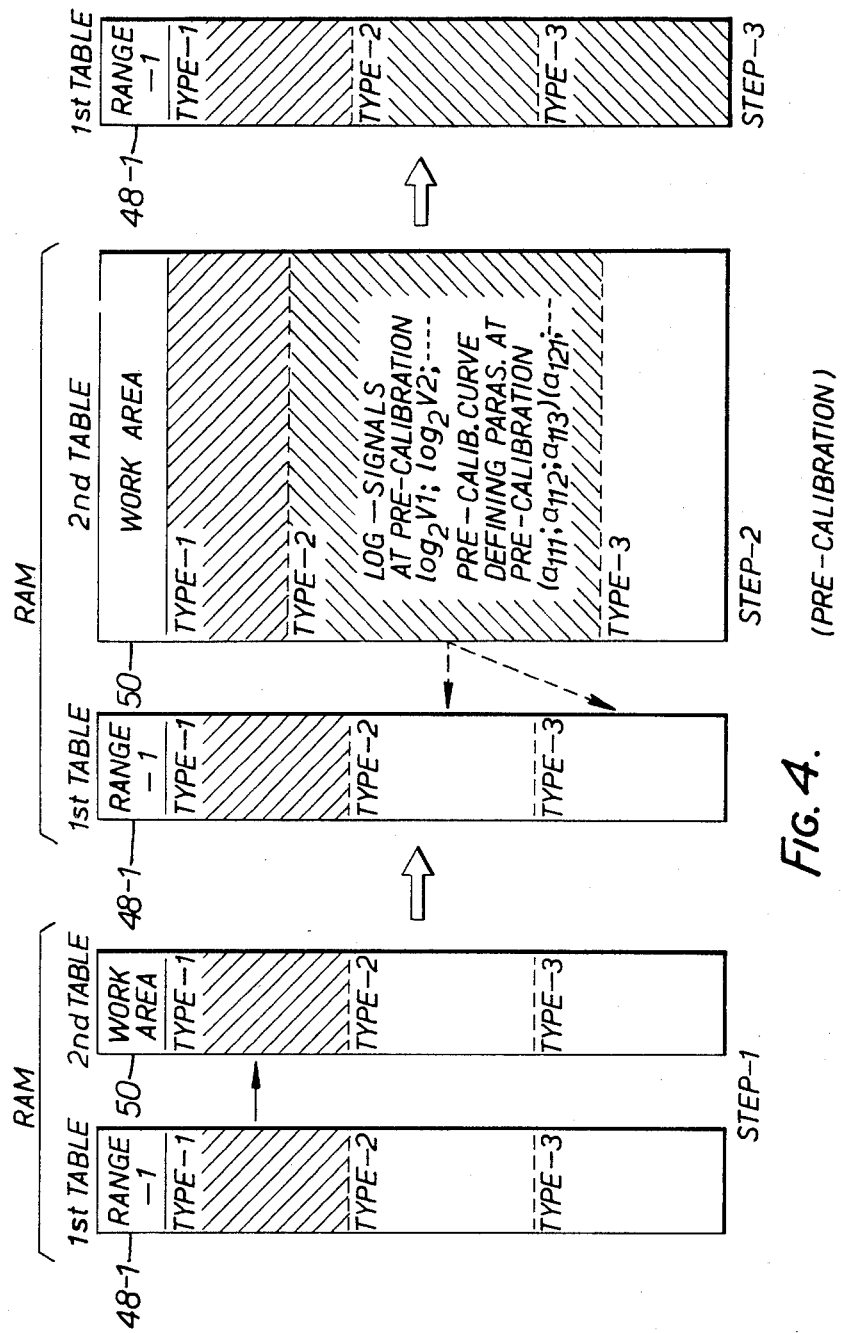
Figure 5:
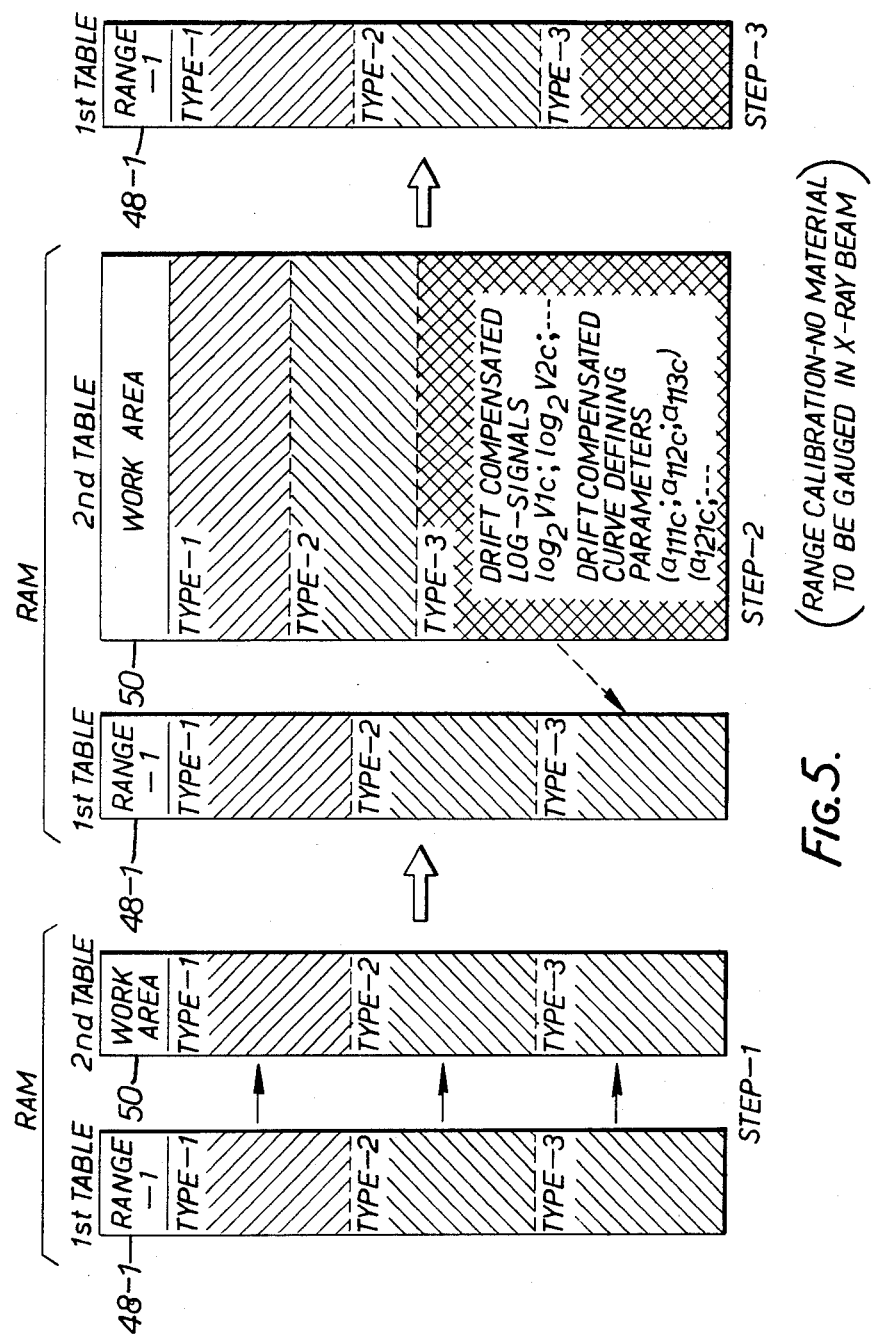

Referring now to FIGS. 3-5, the processing of data through memory 18 (FIG. 1) will be described. Memory 18 includes a read only memory (ROM) and a random access memory (RAM) shown schematically in FIG. 3. The ROM includes a common data base 42 which contains data for calibration and measurement common to all ranges such as the program for pre-calibration (FIG. 10 Flow Chart), program for range-calibration (FIG. 11 Flow Chart), program for measuring (FIG. 12 Flow Chart), alloy compensation equation, basic quadratic equation and range selection zone data. The basic quadratic equation and range selection zone will be set forth hereinafter. Also included in the ROM are range data bases 44-1, 44-2, 44-3, . . . 44-n which contain data specific to each respective range. The RAM includes first and second tables 46 and 50 where the first table includes data range areas 48-1, 48-2, 48-3, . . . 48-n corresponding to each respective range. The second table 50 is used as a work area. In each of the tables 46 and 50, the respective data areas include type-1, type-2, and type-3 data. The type-1 data corresponds to the respective range data stored in the ROM range data bases 44-1, 44-2, 44-3, . . . 44-n. The type-2 data corresponds to the results of precalibration of the non-contact thickness gauge and the type-3 data corresponds generally to the results of the range calibration operation. The second table 50 of the RAM is a work area with a capacity for storing one set of type-1, type-2, and type-3 data for a particular range.

The transfer of data within memory 18 and with processor 14, which facilitates the gauge system operations, will now be described. At the beginning of the precalibration operation, range data from the range data bases 44-1, 44-2, 44-3, . . . 44-n in the ROM are transferred to the type-1 data areas of the respective range tables 48 in table 1 of the RAM (FIG. 3).

Referring to FIG. 4 which is descriptive of the precalibration operation for range-1, the type-1 data stored in the type-1 data area of range table 48-1 is transferred to the work area of the second table 50. This is shown as the first step. The result data of precalibration is then written into the type-2 data area of work area 50 as shown in step 2. The result data is transferred to both the type-2 and type-3 data base areas of the first table 48-1 of the RAM and stored as shown in steps 2 and 3.

Referring now to FIG. 5 range calibration of range-1 will be described. The data from the first range table 48-1 is transferred to the work area of the second table 50 in step 1. This is indicated by the arrows in step one. As the operation continues, the result data of range calibration is written into the type-3 data area of the work area 50 and transferred to the type-3 data area of the range table 48-1 as shown by the arrow in step 3.

The measurement of the thickness of the material in range 1 proceeds using the drift compensated curve stored in the type-3 area of the range 48-1 of the RAM first table as shown in step 3 of FIG. 5.

After the measurement operation, when range-1 is again selected by the setting and range selecton step, the contents of the range area 48-1 of the RAM first table will be the same as the contents of the range area 48-1 obtained in the next proceeding range calibration procedure unless the pre-calibration has been performed after the measurement. In other words, the type-3 data of the RAM range table 48-1 is updated at each time that range calibration for that particular range is required.

DETAILED OPERATION OF THE THICKNESS GAUGE

The operation, including precalibration, range calibration and measurement, of the non-contact radiation thickness gauge system of the present invention will now be described in even more detail with reference to FIGS. 6, 7, 8 and 9.

Figure 6:
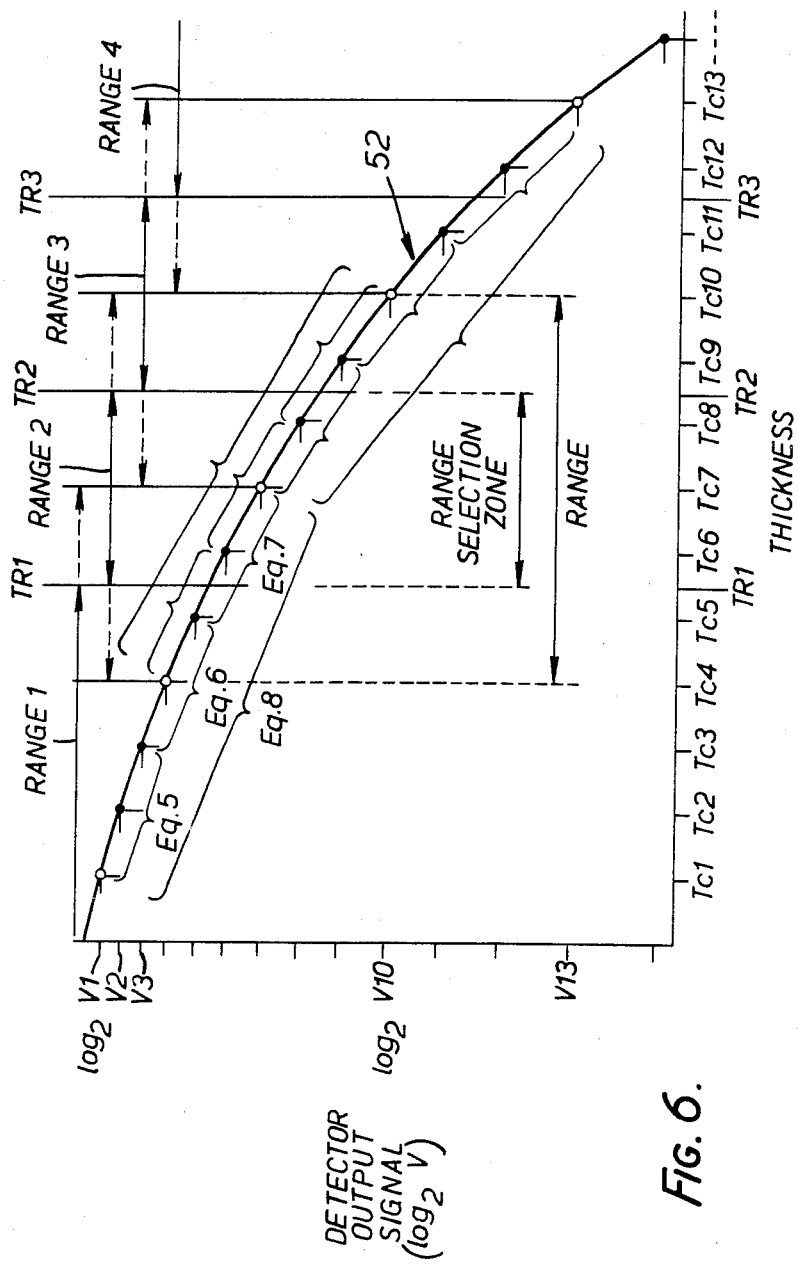
FIG. 6 shows the precalibration curves for several ranges and range selection zones.

Referring specifically to FIG. 6, the precalibration operation will be described. The calibration points are selected to approximate a geometric progression of thickness values throughout all ranges of thicknesses that are to be measured by the system. It is preferred that the calibration points be selected so that the respective thicknesses at the calibration points can be composed of a single standard plate from magazine 21 or of a combination of two or at the most three standard plates from magazine 21.

FIG. 6 shows the functional relation between thickness values and corresponding output signals of the A/D converter 12. The calibration points Tc1, Tc2, Tc3, . . . Tcn are plotted on a logarithmic scale along the x-axis. The digital output signals V are converted by arithmetical operation in processor 14 to logarithmic signals referred to hereafter as "log-signals." These log-signals are plotted on the y-axis.

As here embodied each thickness range has seven calibration points including points at the respective ends of the range. For instance, range 1 extends from Tc1 to Tc7 and range 2 extends from Tc4 to Tc10. As is clear from FIG. 6 the respective ranges partially overlap with each other. Range selection zones within each range, however, which are used in the range selection operation do not overlap with like zones in adjacent ranges. For example, range 2 has a range selection zone which extends from points TR1 to TR2. The next range selection zone is for range 3 which extends from TR2 to TR3. Thus, there is generally no overlap in the range selection zones.

During precalibration a standard plate or plates having a composite thickness, Tc1 for instance, are inserted into the radiation beam path 4 and an output signal V1 is generated. This signal is applied in a digital format, preferably 16 bits, from A/D converter 12 to processor 14 and an arithmetical operation is performed converting the digital signal to a $\log_2 V$ signal.

During the precalibration operation, the magazine 21 is activated under control of processor 14 to insert the standard plates having thicknesses Tc1, Tc2, Tc3, . . . Tcn successively into the path of the radiation beam for sequential calculation in processor 14 of log-signals $\log_2 V1$, $\log_2 V2$, $\log_2 V3$, . . . $\log_2 Vn$ which are stored in memory 18. Memory 18 stores the data points (Tc1, $\log_2 V1$), (Tc2, $\log_2 V2$), (Tc3, $\log_2 V3$), . . . (Tcn, $\log_2 Vn$). The thickness points Tc1, Tc2, Tc3 . . . Tcn are stored in the respective ROM range data bases and the log-signals $\log_2 V1$, $\log_2 V2$, $\log_2 V3$, . . . $\log_2 Vn$ are stored in the type-2 data area of the first table (FIG. 4). A curve 52 as shown in FIG. 6 is obtained by connecting the data points and represents the calibration curve for those points.

In the precalibration operation calibration curves are prepared for each respective range. Therefore, as many calibration curves are prepared as there are ranges. Each range is divided into three subranges which are defined by three calibration points including two calibration points at the ends of the subrange. A quadratic curve, as here embodied a parabolic curve, passes through the three points of calibration and serves as the precalibration curve for that subrange. The precalibration curve for each range is composed of the three quadratic curves connected together. (The various curves for range-1 are identified in FIG. 6 by corresponding equation nos. which equations are developed below.)

The non-contact thickness gauge of this invention relies on the relationship between the log-signal $\log_2 V$ and the thickness T of the material measured. This relationship can be expressed by the following quadratic equation with a desired precision for a particular range of thicknesses:

$$T = a_1 + a_2(\log_2 V) + a_3(\log_2 V)^2 \qquad \text{Eq. 1}$$

For example, the curve for the subrange consisting of the calibration points Tc1, Tc2, Tc3 within range-1 can be derived as follows:

$$Tc1 = a_{111} + a_{112}(\log_2 V1) + a_{113}(\log_2 V1)^2 \qquad \text{Eq. 2}$$

$$Tc2 = a_{111} + a_{112}(\log_2 V2) + a_{113}(\log_2 V2)^2 \qquad \text{Eq. 3}$$

$$Tc3 = a_{111} + a_{112}(\log_2 V3) + a_{113}(\log_2 V3)^2 \qquad \text{Eq. 4}$$

The above simultaneous equations are solved for the three unknowns ($a_{111}$, $a_{112}$, $a_{113}$) by processor 14 and the desired curve for the first subrange is determined. The parameters ($a_{111}$, $a_{112}$, and $a_{113}$) define the precalibration curve consisting of points Tc1, Tc2, and Tc3.

Assuming that the solution of the above simultaneous equations 2, 3, and 4 can be expressed by:

$$(Tc1, \log_2 V1), (Tc2, \log_2 V2), (Tc3, \log_2 V3) \rightarrow a_{111}, a_{112}, a_{113} \qquad \text{Eq. 5}$$

The curve defining parameters for the other subranges can be given as follows:

$$(Tc3, \log_2 V3), (Tc4, \log_2 V4), (Tc5, \log_2 V5) \rightarrow a_{121}, a_{122}, a_{123} \qquad \text{Eq. 6}$$

$$(Tc5, \log_2 V5), (Tc6, \log_2 V6), (Tc7, \log_2 V7) \rightarrow Ya_{131}, a_{132}, a_{133} \qquad \text{Eq. 7}$$

As a result of these computations the precalibration curve for range-1 can be defined by three sets of curve defining parameters, ($a_{111}$, $a_{112}$, $a_{113}$), ($a_{121}$, $a_{122}$, $a_{123}$) and ($a_{131}$, $a_{132}$, $a_{133}$). These parameters are stored in the type-2 data area of work area 50 as shown in FIG. 4.

Curve defining parameters for the remaining ranges are obtained in a similar manner. (Brackets on the curves of FIG. 6 show the other ranges and subranges.)

It is desirable that the non-contact radiation thickness gauge system operates in a stable manner. However, the non-contact thickness gauge system is a very sensitive apparatus which is subject to drift over time. If it is assumed that the drift is negligible, the thickness of a material to be gauged can be derived from the precalibration curves described above. Based on the nominal thickness and the alloy compensation coefficient of the material to be gauged which values are set in setter unit 16 an apparent thickness (compensated thickness) is first derived. The precalibration curve is then selected for a range having a range selection zone to which the obtained apparent thickness belongs. It falls between the end points of the range selection zone. The material is placed in the path of the radiation beam 4 to obtain a log-signal, and a thickness T is determined using the selected precalibration curve.

However, due to drifts in the non-contact thickness system which are experienced in actual application, a range calibration operation is performed just before measurement to compensate for such drifts. The range calibration operation when performed immediately before each measurement, maintains an accuracy of the gauge system on the order of 0.1% over the entire range.

The range calibration operation will now be discussed in detail with reference to FIGS. 7-9. The range calibration operation is comprised of setting the nominal thickness and alloy compensation for the material, selecting the appropriate range and compensating the selected range for drift.

The nominal thickness and alloy compensation coefficient of the material to be gauged are set in the setting unit 16. The apparent thickness $T_{ap}$ is derived by processor 14 from the nominal thickness $T_n$ and the alloy compensation coefficient N from the thickness setting unit 16 and a corresponding range is selected on the basis of a range selection zone to which the apparent thickness belongs. This calculation is well-known in the art and is based upon the relationship $$T_{ap} = \left(1 + \frac{N}{100}\right) T_n$$

where N is expressed in percent value.

The range calibration operation is completed by compensating the selected range for drift. This will be explained with reference to FIGS. 7-9. Range calibration involves the determination of a single quadratic curve which is representative of the log-signal to thickness relationship for one range as a whole. Only three calibration points, points at the respective ends and the center of the range, out of the seven points used to determine the range in the precalibration operation are utilized. As an example, the range calibration for range-1 relies upon the endpoints Tc1 and Tc7 and the midpoint Tc4.

With no material in the radiation path, the data (Tc1, $\log_2 V1$), (Tc4, $\log_2 V4$), (Tc7, $\log_2 V7$) which was stored in the precalibration operation discussed above are used to derive $a_{101}$, $a_{102}$, $a_{103}$ from the following equations:

$$\left.\begin{array}{l} Tc1 = a_{101} + a_{102}\log_2 V1 + a_{103}(\log_2 V1)^2 \\ Tc4 = a_{101} + a_{102}\log_2 V4 + a_{103}(\log_2 V4)^2 \\ Tc7 = a_{101} + a_{102}\log_2 V7 + a_{103}(\log_2 V7)^2 \end{array}\right\} \text{Eq. 8}$$

Figure 7:
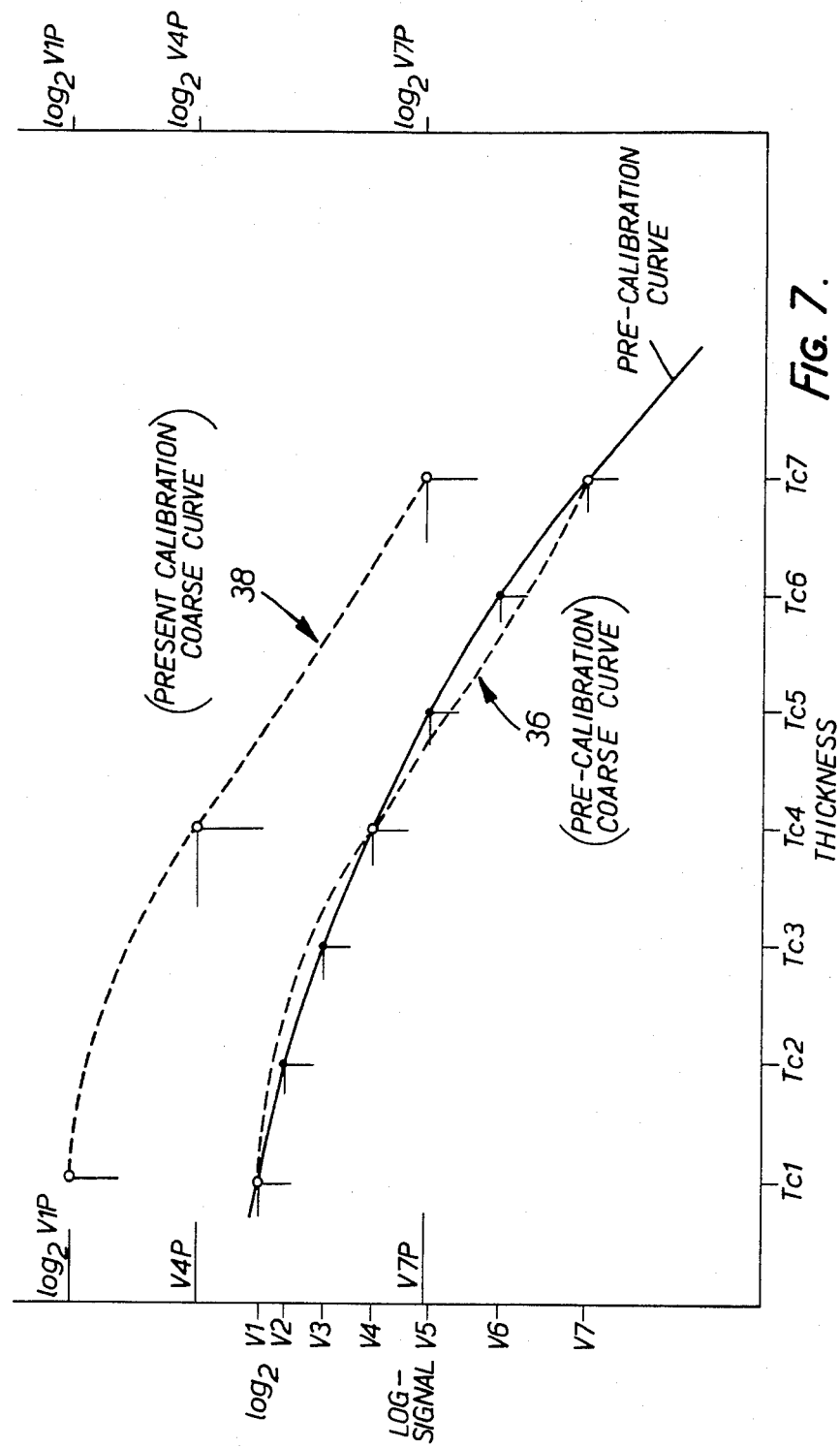
FIGS. 7–9 show range calibration of the non-contact radiation thickness gauge system.

A precalibration coarse curve 36 is defined by the simultaneous solution to these equations and the resulting curve is shown in FIG. 7. The parameters ($a_{101}$, $a_{102}$, $a_{103}$), define the precalibration coarse curve for range 1.

Simultaneously, the magazine 21 is actuated by processor 14 to insert successively standards having thicknesses Tc1, Tc4, Tc7 into the path of the radiation beam to obtain present or current data (Tc1, $\log_2 V1p$), (Tc4, $\log_2 V4p$), (Tc7, $\log_2 V7p$). This current or present time data is used to derive a present calibration coarse curve 38 with parameters $a_{101p}$, $a_{102p}$, $a_{103p}$, by using a similar arithmetical operation as above.

Figure 8:
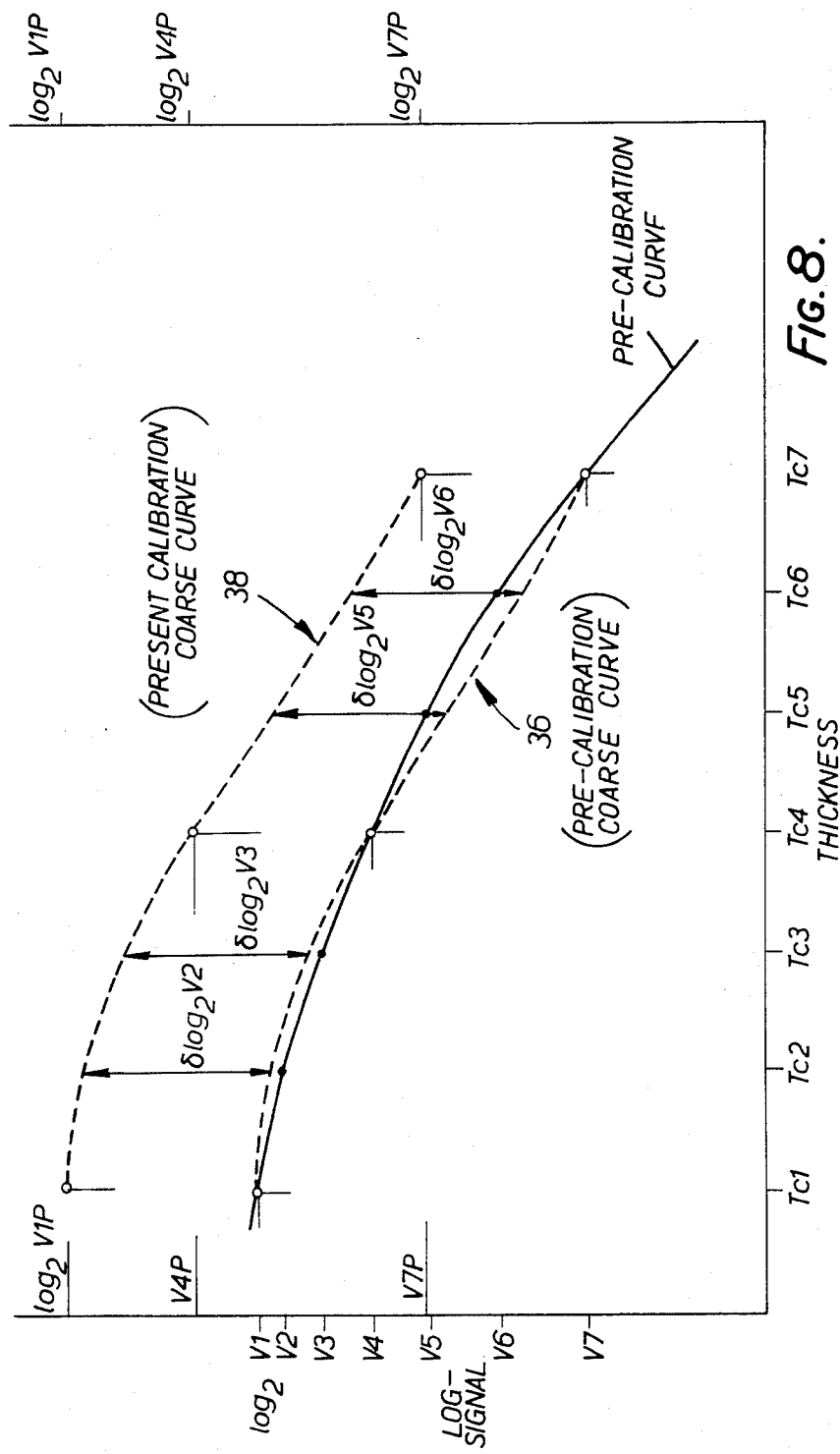

Referring now to FIG. 8, the drift values $\Delta\log_2 V2$, $\Delta\log_2 V3$, $\Delta\log_2 V5$, and $\Delta\log_2 V6$ for the respective points Tc2, Tc3, Tc5 and Tc6 are calculated by processor 14 using curves 36 and 38. These drift values which are approximate values obtained through interpolation between curves 36 and 38, represent the drift from the time of precalibration to the present time respectively for each of the calibration points. In practice the drift values are calculated in the processor 14 using the curve-defining parameters for curve 36 ($a_{101}$, $a_{102}$, $a_{103}$) and the curve defining parameters for curve 38 ($a_{101p}$, $a_{102p}$, $a_{103p}$).

Therefore the new compensated values for log-signals $\log_2 Vnc$ are expressed as follows:

$\log_2 V1_c = \log_2 V1p$ $\log_2 V2_c = \log_2 V2 + \Delta\log_2 V2$ $\log_2 V3_c = \log_2 V3 + \Delta\log_2 V3$ $\log_2 V4_c = \log_2 V4p$ $\log_2 V5_c = \log_2 V5 + \Delta\log_2 V5$ $\log_2 V6_c = \log_2 V6 + \Delta\log_2 V6$ $\log_2 V7_c = \log_2 V7p$ These compensated log-signals are stored in memory 18.

A calibration curve is derived using the compensated log-signals to provide a compensated calibration curve 40. Specifically the following arithmetical operations are performed as was done above for the precalibration curves.

$(Tc1, \log_2 V1c), (Tc2, \log_2 V2c), (Tc3, \log_2 V3c) \rightarrow a_{111c}, a_{112c}, a_{113c}$  Eq. 9

$(Tc3, \log_2 V3c), (Tc4, \log_2 V4c), (Tc5, \log_2 V5c) \rightarrow a_{121c}, a_{122c}, a_{123c}$  Eq. 10

$(Tc5, \log_2 V5c), (Tc6, \log_2 V6c), (Tc7, \log_2 V7c) \rightarrow a_{131c}, a_{132c}, a_{133c}$  Eq. 11

Figure 9:
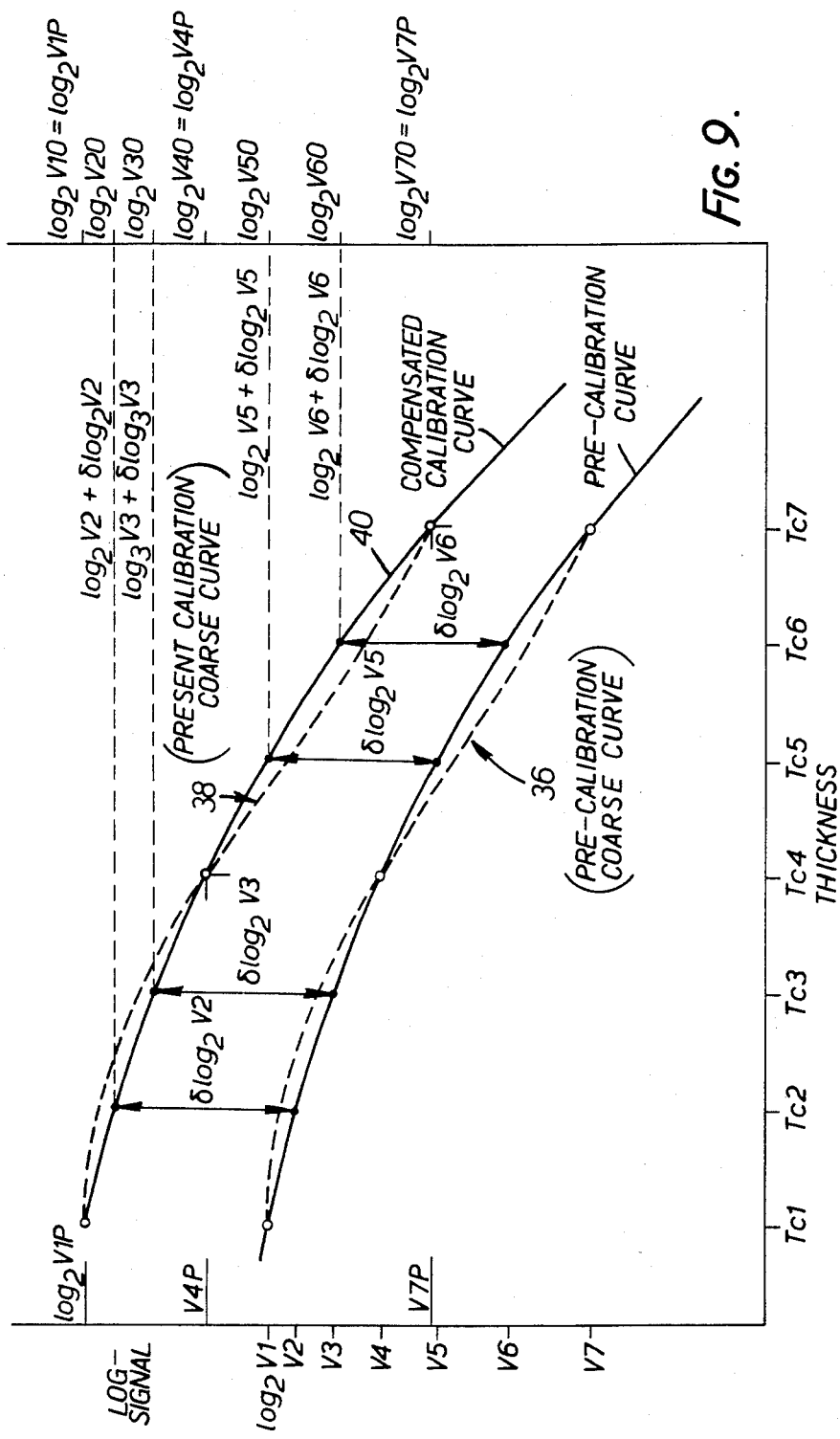

From these arithmetical operations, a drift compensated calibration curve 40 which consists of three connected quadratic curves is plotted as shown in FIG. 9. The compensated calibration curve defining parameters ($a_{111c}$, $a_{112c}$, $a_{113c}$, et seq.), for the drift compensated calibration curve are stored in the type-3 data area of memory 18. A similar compensated calibration curve can likewise be determined for the other ranges.

Finally the measuring operation for the noncontact thickness gauge of the present invention is accomplished. The material to be measured is placed in the path of the radiation beam and the thickness T of the material is calculated by processor 14 using the drift compensated calibration curve obtained above. The deviation $\Delta T = T - T_n$, where $T_n$ is the nominal thickness, is calculated in processor 14 and the computed deviation $\Delta T$ is shown on indicator 20.

As an example of the measuring operation, we can assume that range-1 has been selected in the range selection step discussed before. As previously discussed the drift compensated calibration curve 40 for range-1 is composed of three quadratic curves corresponding to respective subranges to form range-1. Therefore it is necessary to first determine which of the three quadratic curves is to be used to calculate the thickness of the material being measured. The connection points of the three quadratic curves are defined by (Tc3, $\log_2 V3c$) and (TC5, $\log_2 V5c$). The log-signal generated in response to the presence of the material in the radiation beam is therefore compared with $\log_2 V3c$ and $\log_2 V5c$ to determine which one of the three quadratic curves should be selected. Once the curve is selected, processor 14 calculates the thickness of the material using the log-signal and the selected curve.

Since the calculated thickness Tcd is obtained from the drift compensated calibration curve, this value will not be the true value but the apparent value when the alloy of material to be gauged is different from that of the standard plates. This is so since the drift compensated calibration curve is based on measurements made with the standard plates. The true thickness T is expressed by:

$$T = \frac{T_{cd}}{1 + \frac{N}{100}}$$

Then the deviation value from the nominal thickness of the material will be:

$$\Delta T = T - T_n = \frac{T_{cd}}{1 + \frac{N}{100}} - T_n$$

This arithmetical calculation is performed by processor 14.

Figures 10, 11:
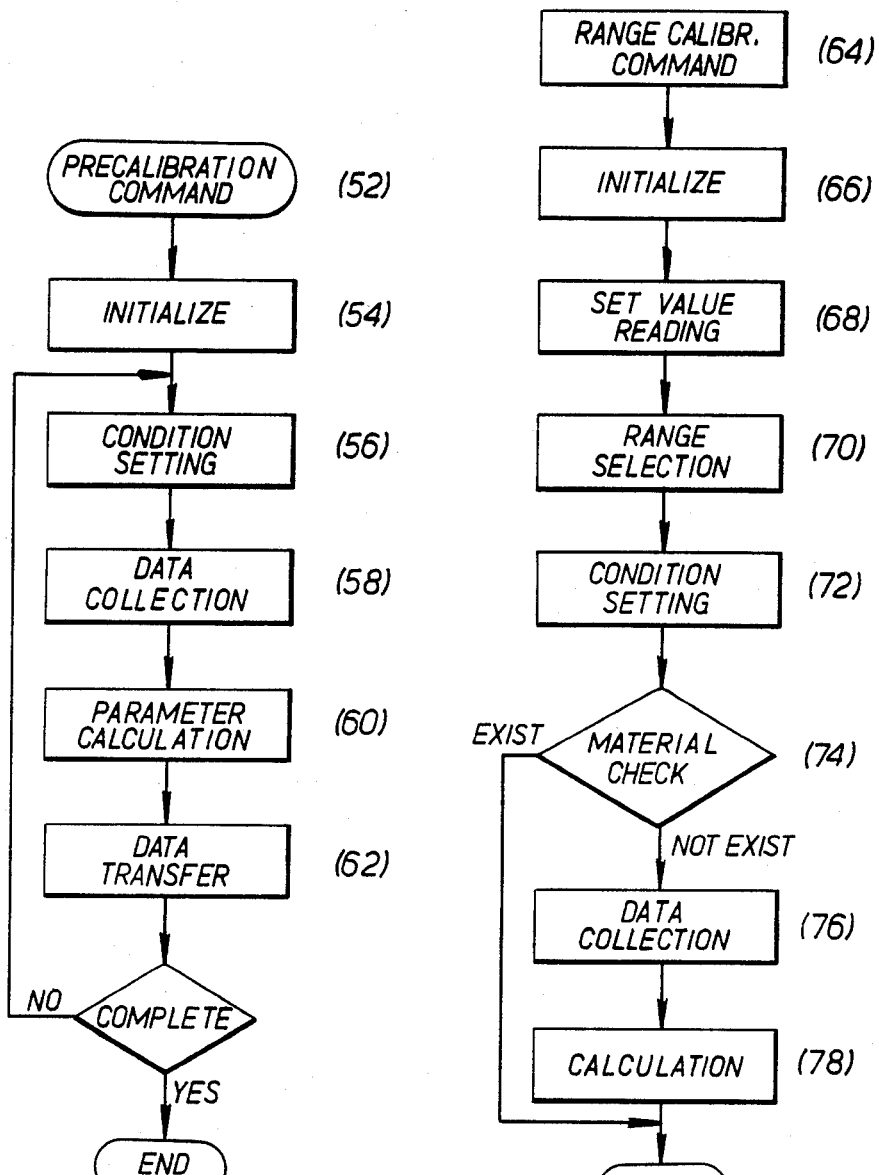
FIGS. 10–12 show the respective flow charts for the precalibration operation, the range calibration operation and the measurement operation.
Figure 12:
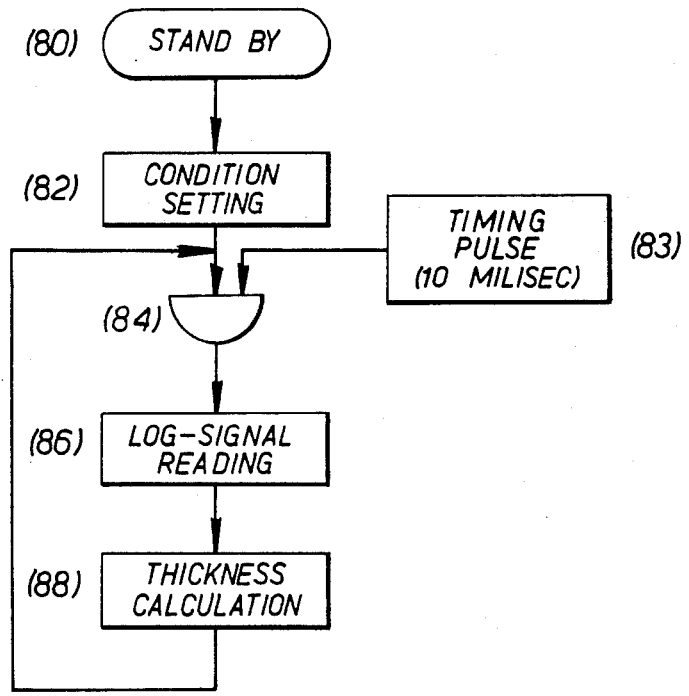

FIGS. 10, 11, and 12 respectfully show flow charts for overall precalibration operation, the range calibration operation and the measurement operation discussed above. These respective flow charts summarize the operation of the noncontact radiation thickness gauge system of the present invention.

As shown in FIG. 10 the precalibration operation begins with precalibration command 52 and under the control of processor 14 the initializing step 54 causes the transfer of data from the ROM of memory 18 to type-1 data area of the first table 46 of the RAM FIG. 3.

The next step is condition setting 56. Data for the single selected range is transferred from the first table 46 to the type-1 data area of work area 50 FIG. 4. Depending upon the selected range and the material being measured, processor 14 sets the radiation source voltage and preamplifier gain to some predetermined values.

Next is data collecton 58. Standard plates from standard magazine 21 are inserted sequentially under control of processor 14 into the radiation beam path. The digital output of the A/D converter 12 is read and converted by processor 14 to the log-signals which in turn are stored in the type-2 data area of work area 50.

Parameter calculation 60 is the next step in the precalibration operation. The parameters [e.g. ($a_{111}$, $a_{112}$, $a_{113}$), ($a_{121}$, $a_{122}$, $a_{123}$), ($a_{131}$, $a_{132}$, $a_{133}$)] are calculated in processor 14 and stored in the type2 data area of work area 50.

Finally data transfer step 62 takes place from the type-2 area of work area 50 to the type-2 and -3 areas of the first table 46 (FIG. 4).

These steps are repeated until all parameters of all the ranges are obtained.

The flow chart for the steps in the range calibration operation are shown in FIG. 11. Range calibration command 64 is given and the system is initialized in step 66. Next the set value reading 68 occurs during which nominal thickness $T_n$ and alloy compensation coefficient N are read out of setting unit 16.

Range selection step 70 includes the arithmetic operation in processor 14 to calculate the apparent thickness $T_{ap}$ of the material. The range is selected by determining in which range selection zone the apparent thickness $T_{ap}$ belongs, i.e. lies within that range's range selection zone.

Then condition setting step 72 causes a data transfer from the type-1, -2 and -3 areas of selected range in the first table to respective areas of work area 50 (FIG. 5). The radiation source voltage and the preamplifier gain are set to predetermine the values depending upon the selected curve and type of material.

In the next step of the range calibration operation, the material check 74 is made to determine whether a material to be gauged is located in the radiation beam path. Assuming there is no material located in the beam path, the data collecting step 76 takes place and standard plates for selected thicknesses (e.g. Tc1, Tc4, and Tc7) are sequentially inserted into the radiation beam path. Log-signals are obtained for current or present time readings (e.g. $\log_2 V1_p$, $\log_2 V4_p$, $\log_2 V7_p$).

The final step is calculation 78 which includes determining the precalibration coarse curve parameters [e.g. ($a_{101}$, $a_{102}$, $a_{103}$)] and the present coarse curve parameters [e.g. ($a_{101p}$, $a_{102p}$, $a_{103p}$)]. Drift values (e.g. $\Delta\log_2 V2$, $\Delta\log_2 V3$, $\Delta\log_2 V5$, $\Delta\log_2 V6$) are calculated and the compensated log-signals are calculated and stored in the work area 50. The compensated calibration curve parameters [e.g. $a_{111c}$, $a_{112c}$, $a_{113c}$), ($a_{121c}$, $a_{122c}$, $a_{123c}$), ($a_{131c}$, $a_{132c}$, $a_{133c}$)] are calculated in processor 14 and stored in the work area 50 of memory 18. Finally data of the compensated log-signals and the drift compensated calibration curve parameters are transferred to the first table type-3 area of the RAM (FIG. 5). If after step 74 material exists in the radiation path steps 76 and 78 are bypassed.

Finally with regard to the operation of the noncontact radiation thickness gauge system of the present invention, the measurement operation is shown step by step in the flow chart of FIG. 12. In the standby mode 80, the measurement operation begins with condition setting 82 when standard plates are withdrawn under control of processor 14 from the radiation beam path. A timing pulse 83 which for instance can occur every 10 millisecond is applied to AND gate 84. The timing pulse 83 combined with condition setting 82 causes the measurement sequence to begin.

The log-signal reading step 86 includes determining the log-signals for the material now in the radiation beam path as calculated by processor 14.

Thickness calculation 88 is then conducted. One of the quadratic curves which is a part of the drift compensated calibration curve for this selected range is chosen. The thickness $T_{cd}$ is calculated using the selected quadratic curve. Then the true thickness T is calculated by the following relation:

$$T = \frac{T_{cd}}{1 + \frac{N}{100}}$$

Finally the deviation $\Delta T$ is obtained by the arithmetic calculation $\Delta T = T - T_n$.

What is claimed is:

1. A noncontact thickness gauge system for measuring the thickness of a material which uses a plurality of movable standards of predetermined thickness values comprising:
   a source of penetrating radiation:
   means for detecting radiation from said source and producing output signals V functionally related to the level of radiation received where said level of received radiation is a function of the radiation absorption characteristic and thickness of material located in the radiation path between said source and said detecting means;

means for automatically inserting standards and the material to be measured into said radiation path;

memory means for storing calibration curve-defining parameters for a plurality of curves which correspond to respective ranges of thickness relating to corresponding output signals of said detecting means when said standards having respective thicknesses corresponding to a predetermined set of calibration points are in said radiation path, where said calibration points are selected to approximate a geometric series of thickness values over all said ranges;

means for setting a nominal thickness and alloy compensation coefficient for the material to be measured which is within one of said plurality of ranges, said means providing an output signal indicative of said nominal thickness and alloy compensation coefficient; and means for processing output signals of said detecting means and said setting means when said material to be measured is in said radiation path with a calibration curve stored in said memory means representing said one of said plurality of ranges to determine the thickness of said material, said processing means also being connected to said inserting means for controlling the insertion of selected ones of the movable standards of said material into said radiation path, and wherein said processing means also compensates said calibration curve representing said one range for drift.

2. The gauge system of claim 1 wherein the calibration curves stored in said memory means are defined by at least three of said calibration points.

3. The gauge system of claim 1 wherein the calibration curve used in said processing means is selected based on the thickness of the material to be measured belonging in the range which corresponds to said calibration curve.

4. The gauge system of claim 1 wherein said plurality of calibration curves stored in said memory are in overlapping relationship to each other.

5. The gauge system of claim 1 wherein said plurality of curves are quadratic curves.

6. The noncontact thickness gauge system of claim 5 wherein said plurality of quadratic curves are parabolic.

7. The gauge system of claim 1 wherein said output signals of said detecting means are operated on by said processing means to produce logarithmic functions of said output signals.

8. The gauge system of claim 7 wherein said calibration curves are based on the relationship between said logarithmic function of said output signals and the calibration points.

9. The gauge system of claim 1 wherein said detecting means further includes an analog-to-digital converter connected to said processing means.

10. The gauge system of claim 1 further including a thickness indicator responsive to the output of said processing means to provide an output indication of said thickness.

11. The gauge system of claim 1 wherein the movable standards are selected to have thickness values such that a combination of no more than three are required for a particular calibration point.

12. A method for measuring the thickness of a material using a noncontact radiation thickness gauge system which includes a source of penetrating radiation, means for detecting radiation emitted from said source and producing an output signal functionally related to the level of radiation received, where said level of received radiation is a function of the radiation absorption characteristic and thickness of material located in the radiation path between said source and detector, means for automatically inserting standards and the material to be measured into the radiation path, memory means for storing data, means for processing said output signal and said data and for controlling said inserting means for selective insertion of said standards of said material to be measured, and a magazine of a plurality of movable standards of predetermined thickness values comprising the steps of:

sequentially inserting the standards of predetermined thickness values in said radiation path corresponding to a series of calibration points selected to approximate a geometric series of thickness values over all ranges, and obtaining corresponding output signals;

precalibrating the thickness gauge system for a material using said processing means to obtain a plurality of precalibration curves, each corresponding to a thickness range, said curves relating said calibration points to said corresponding output signals of said detecting means, where each said curve is defined by at least three sets of precalibration points and corresponding output signals;

storing parameters defining said calibration curves in said memory means;

providing signals representative of the nominal thickness and the alloy compensation coefficient for the material to be measured; selecting the calibration curve corresponding to a particular thickness range based on the thickness of the material to be measured belonging in said range; compensating the calibration curve of the selected range for drift, wherein the compensating step includes the step of sequentially re-inserting only those standards corresponding to the selected range and re-obtaining corresponding output valves, the compensating step being carried out nearer to the time of utilization of the gauge system than the pre-calibrating step and withdrawing the standards and inserting the material to be measured into the radiation path between the source detecting means.

13. The method of claim 12 wherein the steps of processing the output signal of said detecting means with said precalibration curve includes calculating a calculated thickness of said material.

14. The method of claims 13 wherein the step of processing further includes the step of calculating the true thickness T from the calculated thickness $T_{cd}$ in accordance with relation $$T = \frac{T_{cd}}{1 + \frac{N}{100}}$$

where N is the alloy compensation coefficient for the material being measured.

15. The method of 13 or 14 wherein the step of processing further includes:

calculating the deviation from a selected nominal value of thickness according to the relation $$\Delta T = T - T_n$$

where

ΔT is the deviation from the nominal value, T is the apparent thickness of the material being measured and $T_n$ is the selected nominal value of thickness.

16. The method of 12 or 13 wherein the plurality of precalibration curves have overlapping thickness ranges.

17. The method of 12 or 13 wherein each of said plurality of precalibration curves is comprised of three quadratic curves which correspond to subranges of said range.

18. A noncontact radiation thickness gauge system for measuring the thickness of a material which has a source of penetrating radiation, means for detecting radiation from said source and producing detection output signals functionally related to the level of radiation received where said level of received radiation is a function of the radiation absorption characteristic and thickness of material located in the radiation path between said source and detecting means and also a function of the drift of the radiation source and the detecting means, and a plurality of movable standards of predetermined thickness values comprising:

means for automatically inserting one or more of said movable standards having a composite thickness of one of a plurality of predetermined calibration thickness points so that said detecting means produces a detection output signal corresponding to said one predetermined calibration thickness point;

said plurality of calibration thickness points being distributed over the total thickness range of the system which is divided into a plurality of other ranges in overlapping relation to each other, each of said other ranges being further formed of adjacent sub-ranges which are each characterized by three calibration thickness points;

processing means for developing a signal functionally related to the thickness value of the material to be measured from said detection output signal when the material to be measured is in said radiation path, said processing means also being connected to said inserting means for controlling the selective insertion of said one or more standards; and means for storing respective thickness values of said calibration thickness points, said storing means, when said processing means generates a precalibration command, also storing parameters related to the detection output signals corresponding to respective calibration thickness points developed by said processing means for defining a plurality of precalibration curves for said respective other ranges, each precalibration curve for each other range being formed of connected quadratic curves corresponding respectively to the sub-ranges forming each said other range, said storing means, when said processing means generates a range-calibration command for drift compensation for one of said other ranges, also storing coarse curve-defining parameters for a precalibration coarse curve of quadratic form developed by said processing means from three of said detection output signals corresponding to three calibration thickness points selected from the respective sub-ranges forming said one of said other ranges, also storing corresponding coarse curve-defining parameters for a present calibration coarse curve of quadratic form developed by said processing means from three detection output signals obtained by inserting again three sets of standards corresponding respectively to the last mentioned three calibration thickness points, and also storing still other curve-defining parameters for a drift compensated calibration curve developed by said processing means based on the difference between said precalibration coarse curve and said present calibration coarse curve, whereby said signal relating to thickness value of the material to be measured is obtained by using said drift compensated calibration curve.

19. A method of calibrating a noncontact radiation thickness gauge system used for measuring the thickness of a material which has a source of penetrating radiation, means for detecting radiation from said source and producing detection output signals functionally related to the level of radiation received where said level of received radiation is a function of the radiation absorption characteristic and the thickness of material located in a radiation path between said source and said detecting means, and where said source and said detecting means are subject to drift, and a plurality of movable standards of predetermined thickness values, comprising the steps of:

inserting one or more of said movable standards having a composite thickness of one of a plurality of predetermined calibration thickness points into said radiation path so that said detecting means produces a detection output signal corresponding to said one predetermined calibration thickness point;

sequentially repeating the step of inserting one or more of said movable standards for each one of the remaining plurality of said predetermined calibration thickness points with the result that detection output signals corresponding respectively to all of the calibration thickness points are provided;

said plurality of calibration thickness points being distributed over a predetermined thickness range formed of adjacent sub-ranges which are characterized by three calibration thickness points;

developing a precalibration curve from thickness values of said calibration thickness points and last mentioned detection output signals corresponding respectively thereto, said precalibration curve being formed of connected quadratic curves corresponding respectively to said sub-ranges;

developing a precalibration coarse curve of quadratic form from thickness values of three calibration thickness points and last mentioned detection output signals corresponding respectively thereto, said last mentioned three calibration thickness points being selected from said calibration thickness points so that said precalibration coarse curve represents an approximate curve of said precalibration curve;

inserting sequentially three sets of standards corresponding respectively to the last mentioned three calibration thickness points into said radiation path to generate three detection output signals, said inserting corresponding sets step being carried out nearer in time to the use of said system for material thickness measurements than both said inserting step and said repeating step;

developing a present calibration coarse curve of quadratic form from said last mentioned three detection output signals and thickness values of calibration thickness points corresponding respectively thereto; and developing a drift compensated calibration curve by compensating said precalibration curve by substantial difference between said precalibration coarse curve values and said present calibration coarse curve values.

20. The method of claim 19 further including the steps of storing the plurality of said detection output signals and the corresponding calibration thickness points and subsequently retrieving said three calibration thickness points and the detection output signal corresponding thereto for developing said precalibration coarse curve.

21. A method of calibrating a noncontact radiation thickness gauge according claim 19, wherein said predetermined thickness range is characterized by seven calibration thickness points.

22. A method of calibrating a noncontact radiation thickness gauge according to claim 20, wherein last mentioned three calibration thickness points relating to said precalibration coarse calibration curve are points of both ends and center of the seven calibration thickness points distributed over said range.

23. A method of calibrating a noncontact radiation thickness gauge according to claim 19, 20 or 21, wherein said step of developing the drift compensated calibration curve comprising the steps of:

developing difference values between said precalibration coarse curve and said present calibration coarse curve at respective said calibration thickness points of said range;

compensating substantially said detection output signals related to said precalibration curve, respectively, by respective said difference values at respective calibration thickness points to obtain compensated detection output signals; and developing said drift compensated calibration curve from said compensated detection output signals.

24. A method of calibrating a noncontact radiation thickness gauge system used for measuring the thickness of a material which has a source of penetrating radiation, means for detecting radiation from said source and producing detection output signals functionally related to level of radiation received where said level of received radiation is a function of the radiation absorption characteristic and the thickness of material located in a radiation path between said source and said detecting means, and where said source and said detecting means are subject to drift, and a plurality of movable standards of predetermined thickness values comprising the steps of:

(a) sequentially inserting predetermined sets of said movable standards so that said detecting means produce detection output signals corresponding respectively to a plurality of predetermined calibration thickness points to define calibration point data, each being representative of a combination of thickness value of respective one of said calibration thickness points and one of last mentioned detection output signals corresponding thereto;

said plurality of calibration thickness points being distributed over a predetermined thickness range formed of adjacent sub-ranges each of which are characterized by a set of three or more calibration thickness points;

(b) developing parameters from said calibration point data for defining a precalibration curve, said precalibration curve being formed of connected nonlinear curves, each being defined by calibration point data corresponding to said set of calibration thickness points which fall in respective one of said sub-ranges;

(c) developing a precalibration coarse curve defining parameters representative of an approximate curve of said precalibration curve and defined by two or more calibration point data selected from said calibration point data;

(d) inserting sequentially sets of movable standards corresponding respectively to sets of calibration thickness points corresponding respectively to last mentioned two or more calibration point data to generate new calibration point data for last mentioned sets of calibration thickness points, wherein said inserting corresponding standards step is carried out nearer in time to the use of said system for measuring material thickness than said sequentially inserting (e) developing a present calibration coarse curve defining parameters defined by said new calibration point data, said present calibration coarse curve being a curve corresponding to said precalibration coarse curve but compensated for drift of the system; and (f) developing parameters which define a drift compensated calibration curve by compensating said precalibration curve by differences between said precalibration coarse curve values and said present calibration coarse curve values.

25. The method of claim 24 further including the steps of storing the plurality of said detection output signals and the corresponding calibration thickness points and subsequently retrieving said three calibration thickness points and the detection output signals corresponding thereto for developing said precalibration coarse curve.

26. A noncontact radiation thickness gauge system for measuring the thickness of a material which uses a plurality of movable standards of predetermined thickness values comprising:

a source of penetrating radiation;

means for detecting radiation from said source and producing output signals V functionally related to the level of radiation received where said level of received radiation is a function of the radiation absorption characteristic and thickness of material located in the radiation path between said source and said detecting means;

means for automatically inserting standards and the material to be measured into said radiation path;

memory means for storing calibration curve-defining parameters for a plurality of curves which correspond to respective ranges of thickness relating to corresponding output signals of said detecting means when said standards having respective thicknesses of calibration points are in said radiation path, where said calibration point are selected to approximate a geometric series of thickness values over all said ranges;

means for setting a nominal thickness and alloy compensation coefficient for the material to be measured which is within one of said plurality of ranges, said means providing an output signal indicative of said nominal thickness and alloy compensation coefficient; and means for processing output signals of said detecting means and said setting means when said material to be measured is in said radiation path with a calibration curve stored in said memory means representing said one of said plurality of ranges to determine the thickness of said material, wherein the calibration curve used in said processing means is selected based on the thickness of the material to be measured belonging in the range which corresponds to said calibration curve.

* * * * *

UNITED STATES PATENT AND TRADEMARK OFFICE
CERTIFICATE OF CORRECTION

PATENT NO. : 4,510,577
DATED : April 9, 1985
INVENTOR(S) : Tatsuo Tsujii and Takaaki Okino It is certified that error appears in the above—identified patent and that said Letters Patent is hereby corrected as shown below:

In claim 1, line 1, after "noncontact" insert
--radiation--.

In claim 24, line 6, before "level" insert
--the--, and
line 49, after "inserting" insert
--step (a);--.

Signed and Sealed this

Nineteenth Day of November 1985

[SEAL]

Attest:

DONALD J. QUIGG

Attesting Officer

Commissioner of Patents and Trademarks